United States Patent Office 3,794,636
Patented Feb. 26, 1974

3,794,636
PROCESS FOR PREPARATION OF THIAZOLE HYDROHALIDES
Mikhail M. Girgis, Guelph, Ontario, Canada, assignor to Uniroyal Ltd., Montreal, Quebec, Canada
No Drawing. Filed Sept. 3, 1971, Ser. No. 177,822
Int. Cl. C07d 91/32
U.S. Cl. 260—247.1     11 Claims

ABSTRACT OF THE DISCLOSURE

Thiazole hydrohalides are synthesized by reacting an alpha-haloacetoacetamide having the formula $$CH_3COCHXCONHR_1$$

with a thionamide having the formula $R_2CSNH_2$ in acetonitrile as a general solvent or in a nitrile having the formula $R_2CN$ where $R_2$ is as in the formula for the thionamide. The thiazole hydrohalide which is precipitated upon cooling the reaction mixture is separated as the product. If desired, the thiazole hydrohalide can be neutralized with a base to form the free thiazole. The products are useful as plant growth regulants and fungicides.

BACKGROUND OF THE INVENTION

(1) Field of the invention

The invention is a novel process of making thiazole hydrohalides by the reaction of an α-haloacetoacetamide with a thionamide in the presence of a nitrile solvent for the two reactants, precipitating the thiazole hydrohalide from the reaction mixture, and recovering it as product.

(2) Description of the prior art

Prior art methods of thiazole synthesis such as are shown in Boon, J. Chem. Soc. (1945), 601; Wyeth, South African Pat. 676,327 (1969); Karrer et al., Helv. Chim. Acta, 28, 820 (1945); Chem. Abstr. 40, 1502 (1946); and Kulka et al., U.S. Pat. 3,547,917, use a solvent such as water, alcohols, benzene, or toluene as medium for reacting α-halo ketones with thionamides. The conditions used by those workers necessitate that the thiazole formed be recovered by several extractions using dilute hydrochloric acid, followed by basification of the acidic solution. The reactants (alpha-halo ketones and thionamides) and the products (thiazoles) are either (1) only slightly soluble in these solvents, e.g., water, benzene or toluene, so that a large volume of solvent is required which decreases the product yields, or (2) very soluble in the solvent, e.g., alcohols, so that it is a difficult as well as a costly process to isolate the product.

SUMMARY OF THE INVENTION

The invention is a process of preparing a thiazole hydrohalide having the general formula:

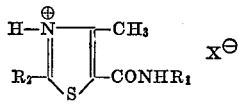

wherein X is halide, $R_1$ is aryl or a halo-, alkyl- or alkoxy-substituted aryl, $R_2$ is alkyl, halo-substituted alkyl, aryl-substituted alkyl, aryl, halo-substituted aryl, alkyl-substituted aryl, or a heterocyclic group containing at least one nitrogen, oxygen or sulfur hetero atom, the heterocyclic ring of said heterocyclic group being less basic than the thiazole ring, which comprises (1) reacting an α-haloacetoacetamide (I) having the general formula:

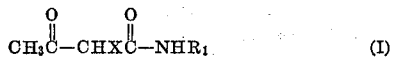

wherein X and $R_1$ are as above, with a thionamide (II) having the general formula:

wherein $R_2$ is as above, in the presence of acetonitrile or a nitrile (III) having the general formula:

$$R_2CN \qquad (III)$$

wherein $R_2$ is as above, as a solvent for reactants (I) and (II), (2) causing precipitation of the thiazole hydrohalide from the reaction mixture, and separating the precipitated thiazole hydrohalide as the product from the reaction mixture.

DESCRIPTION OF THE PREFERRED EMBODIMENTS

In the foregoing formulae, X is preferably chlorine, bromine or iodine, $R_1$ is preferably phenyl or naphthyl or chloro-, bromo-, iodo-, lower ($C_1$ to $C_6$) alkyl- or lower ($C_1$ to $C_6$) alkoxy-substituted phenyl or naphthyl; $R_2$ is preferably a $C_1$ to $C_{12}$ alkyl group, either unsubstituted or substituted with chlorine, bromine or iodine or with phenyl or naphthyl, or is phenyl or naphthyl or chloro-, bromo-, iodo- or lower ($C_1$ to $C_6$) alkyl-substituted phenyl or naphthyl or is a heterocyclic ring representing a cyclic hydrocarbon containing one or more hetero nitrogen, oxygen, or sulfur atoms, exemplified by a morpholido group or a lower ($C_1$ to $C_6$) alkyl-substituted morpholido group, provided that the heterocyclic ring is less basic than the thiazole ring, i.e. its pK value is more than 11.5 which is the pK value of the thiazole ring.[1] (pK is equal to the negative logarithm of the dissociation constant of the organic base in aqueous solution.)

The process of this invention uses either acetonitrile as a general solvent or alkyl, aryl, or heterocyclic nitriles as media for reacting respectively, alkyl, aryl, or heterocyclic thionamides with α-haloacetoacetamides. Preferably the group $R_2$ in the nitrile (where it is other than the general solvent acetonitrile) is identical with the group $R_2$ in the thionamide reactant. The two reactants (thionamide and α-haloacetoacetamide) are quite soluble in the nitrile solvent whereas the product (the thiazole hydrohalide) is essentially insoluble in the nitrile. Accordingly, the process of the invention presents the following advantages over the prior art processes:

(1) The solvent level can be reduced to at least one-half that of the prior art processes so that the productivity of the process may be doubled.
(2) The product (thiazole hydrohalide) which could not be isolated completely by the prior art processes can be isolated by simple filtration.
(3) The product yields are in the range of 90–95% in comparison with the range of 22–75% for the prior art processes.

In an alternative version of the process of the invention the nitrile in excess sufficient to function as solvent may be reacted with hydrogen sulfide gas to form a solution of the resulting thionamide in the excess of the nitrile, whereupon the α-haloacetoacetamide reactant is added to this solution and caused to react with the thionamide to form the desired thiazole hydrohalide.

The process of the invention is conveniently carried out by mixing the α-haloacetoacetamide with the thionamide in the presence of the nitrile solvent (which can be either acetonitrile or a nitrile corresponding to the thionamide reactant provided such nitrile is liquid at ---
[1] Morton, A. A., The Chemistry of Heterocyclic Compounds, Chapter XIII, p. 405; McGraw-Hill Book Co. Inc., New York, 1946.

room temperature or melts below 60° C.), and heating for a short time, say from 15 minutes to 1 hour, at 50–80° C. Precipitation of the thiazole hydrohalide is often initiated at the reaction temperature and in any event is carried out or completed by cooling the reaction mixture. The reaction mixture is then filtered or centrifuged to separate the product which is preferably washed with small amounts of fresh nitrile and dried.

In the typical practice of the invention approximately equimolar amounts of the α-haloacetoacetamide and the thionamide reactants are used. The amount of the nitrile solvent used should be sufficient to dissolve all of the α-haloacetoacetamide and thionamide reactants when the reaction mixture is heated to a moderately elevated temperature. Use of much more than such an amount of nitrile solvent is often undesirable because it reduces productivity. Typically the amount of nitrile solvent ranges in weight from three quarters of the combined weights of the two reactants to three times such combined weights. The reaction is generally carried out by heating the mixture of the two reactants and the nitrile solvent to effect complete solution of both reactants in the solvent and holding the reaction mixture at a temperature of from 70 to 80° C. for 30–60 minutes to effect the reaction and initiate precipitation of the product, after which the reaction mixture is cooled to fully precipitate the product.

The compounds which are prepared in accordance with the process of this invention are useful as plant growth regulants and fungicides.

In a modification, the product thiazole hydrohalide separated from the reaction mixture obtained as described above is neutralized by a suitable base such as sodium carbonate or ammonium hydroxide to form the free thiazole which is then readily recovered from the neutralized mixture. This modification eliminates the complex procedure for recovery of the free thiazole and enhances the economic and commercial attractiveness of the process.

The following non-limiting examples illustrate the practice of the invention. All temperatures are centigrade.

EXAMPLE 1

2,4-dimethylthiazole-5-carboxanilide hydrochloride

A slurry of thioacetamide in acetonitrile containing 37.5 g. (0.5 mole) thioacetamide in 150 ml. acetonitrile was placed in a 500 ml. three-necked flask. The flask was equipped with a mechanical stirrer, thermometer, and reflux condenser. 106 g. (0.5 mole) of α-chloroacetoacetanilide was added and the reaction mixture was heated by hot water bath. An exothermic reaction began soon after the temperature of the mixture reached 50° and the reactants dissolved completely within five minutes. When the temperature of the system reached 70°, a solid product started to separate. The temperature of the mixture was maintained between 65–70° with stirring for 20 minutes. The mixture was then cooled to about 10° and filtered. The solid product was washed with 25 ml. fresh acetonitrile and dried, yield 128 g. (95%), light pink-colored crystals melting at 212–4°. The product was soluble in dilute hydrochloric acid, acetone, ethanol, and slightly soluble in water. It reacted readily with sodium carbonate or ammonium hydroxide solutions to yield the free thiazole. I.R. and elemental analysis of the product confirm that it is 2,4-dimethylthiazole - 5 - carboxanilide hydrochloride. Recrystallization of the product from methanol/ether gave colorless needles, M.P. 213–4°.

EXAMPLE 2

4-methyl-2-propylthiazole-5-carboxanilide hydrochloride

Method A.—In a 250 ml. three-necked flask, equipped with a stirrer, thermometer and reflux condenser 10.3 g. (0.1 mole) thiobutyramide, 21.2 g. (0.1 mole) α-chloroacetoacetanilide and 75 ml. n-butyronitrile were heated by means of a hot-water bath. When the temperature of the reaction mixture reached 40° the reactants dissolved completely and when it reached 70° a white precipitate started to form The reaction mixture was maintained at 70° for one hour. Then it was cooled to about 10° and filtered. The white solid product was washed with 10 ml. acetonitrile and dried, yield 25 g. (88%) of 4-methyl-2-propylthiazole - 5 - carboxanilide hydrochloride, M.P. 165–7°.

Method B.—The procedure of Method A was repeated except 75 ml. of acetonitrile was used as the reaction medium instead of butyronitrile. The yield of 4-methyl-2-propylthiazole - 5 - carboxanilide hydrochloride melting at 166–8° was 27.5 g. (93%).

Recrystallization of the product (obtained by Method A or B) from methanol/ether gave colorless crystals, M.P. 169–170°.

EXAMPLE 3

2-benzyl-4-methylthiazole-5-carboxanilide hydrochloride

Method A.—α-Chloroacetoacetanilide 21.2 g. (0.1 mole), 15.1 g. (0.1 mole) of phenylacetothionamide and 75 ml. of phenylacetonitrile were mixed in a 250 ml. three-necked flask equipped with a stirrer, thermometer and reflux condenser. The reaction mixture was heated gradually using a water-bath. When the temperature of the mixture reached 50° the reactants dissolved and as it approached 70° a white precipitate started to form. The reaction mixture was kept at 70–5° for 40 minutes, then cooled to about 10° and filtered. The solid product was washed with 15 ml. of cold acetonitrile and dried. The yield of 2 - benzyl - 4 - methylthiazole - 5 - carboxanilide hydrochloride melting at 157–9° was 31 g. (90%).

Method B.—The procedure of Method A was repeated except 75 ml. of acetonitrile was used as the reaction medium instead of phenylacetonitrile. The yield of 2-benzyl - 4 - methylthiazole - 5 - carboxanilide hydrochloride melting at 156–8° was 32 g. (93%).

Recrystallization of the product (obtained by Method A or B) from methanol/ether gave colorless needles, M.P. 161–2°.

EXAMPLE 4

4-methyl-2-phenylthiazole-5-carboxanilide hydrochloride

Method A.—13.7 g. (0.1 mole) benzothionamide, 21.2 g. (0.1 mole) α-chloroacetoacetanilide and 75 ml. benzonitrile were placed in a three-necked flask (as in Example 1). The reaction mixture was gradually heated to 70–5°. At 50°, the reaction mixture became clear, then a precipitate started to form as the temperature of the reaction mixture reached 70°. The reaction was maintained under these conditions for 30 minutes, then cooled to 10° and filtered. The thiazole hydrochloride was washed with 15 ml. cold acetonitrile and dried. The product was a yellow crystalline material melting at 169–170°, yield 31 g. (95%).

Method B.—The procedure of Method A was repeated except 75 ml. of acetonitrile was used as the reaction solvent instead of benzonitrile. The yield of 4-methyl-2-phenylthiazole-5-carboxanilide hydrochloride melting at 166–8° was 31 g. (95%).

Recrystallization of the product (obtained by Method A or B) from methanol/ether gave colorless needles melting at 170–1°.

EXAMPLE 5

4-methyl-2-m-tolylthiazole-5-carboxanilide hydrochloride

Method A.—In a 250 ml. three-necked flask (equipped as specified in Example 1) 15.2 g. (0.1 mole) m-toluthionamide was mixed with 21.2 g. (0.1 mole) α-chloroacetoacetanilide and 50 ml. m-tolunitrile. The reaction mixture was heated slowly in a water bath. When the temperature reached 50°, the reactants dissolved, and when it reached 70° a precipitate started to form. The reaction mixture was maintained at 70–75° for 30 minutes, then cooled to 10° and filtered. 4 - methyl-2-m-tolylthiazole-5-carboxanilide hydrochloride was washed with 15 ml. m-tolunitrile and dried. The yield was 33 g. (96%), yellow-colored crystals melting at 176–8°.

Method B.—The procedure of Method A was repeated except that 50 ml. acetonitrile was used instead of m-tolunitrile. 33 g. yield (96%) of 4-methyl-2-m-tolylthiazole-5-carboxanilide hydrochloride, M.P. 179–182° was obtained.

Recrystallization of the product (obtained by Method A or B) from methanol/ether gave clear yellow crystals which melted at 184–5°.

EXAMPLE 6

4-methyl-2-N-morpholinothiazole-5-carboxanilide hydrochloride

Method A.—In a 100 ml. three-necked flask (equipped as specified in Example 1) a slurry of N-morpholinothionamide, 6.4 g. (0.04 mole) in N-morpholinonitrile (20 ml.) was heated slowly with 8.5 g. (0.04 mole) α-chloroacetoacetanilide. When the temperature of the reaction mixture reached 70–5°, the reactants dissolved completely. The reaction mixture was maintained at 70–5° for one hour, then cooled to 10° and filtered. The solid product was washed with 10 ml. cold acetonitrile and dried. 13.2 g. of 4-methyl-2-N-morpholinothiazole-5-carboxanilide hydrochloride [1] (90%), M.P. 205–210° was obtained. Recrystallization of the product from ethanol/ether gave colorless needles which melted at 214–6°.

EXAMPLE 7

2,4-dimethylthiazole-5-(2,4,6-trimethylcarboxanilide) hydrochloride 7.5 g. (0.1 mole) thionacetamide, 25.4 g. (0.1 mole) α-chloro - 2,4,6 - trimethylacetoacetanilide and 100 ml. acetonitrile were stirred in a 250 ml. three-necked flask (equipped as specified in Example 1). The reaction mixture was heated slowly in a water bath. When the temperature of the reaction reached 30° all the reactants dissolved completely and when it reached 70° a precipitate started to form. The reaction mixture was maintained at 70–5° for one hour, then cooled to 10° and filtered. The product was washed with 15 ml. cold fresh acetonitrile and dried. 27 g. (90%) of 2,4 - dimethylthiazole-5-(2,4,6-trimethylcarboxanilide) hydrochloride was obtained, M.P. 188–196°. Recrystallization of the product from ethanol/ether gave white crystals, M.P. 198–201°.

EXAMPLE 8

2,4-dimethylthiazole-5-(o-methoxycarboxanilide) hydrochloride 3.75 g. (0.05 mole) thionacetamide, 12.2 g. (0.05 mole) α-chloroacetoacet-o-anisidide and 20 ml. acetonitrile were placed in a three-necked flask (equipped as specified in Example 1). The reaction mixture was gradually heated to 75°. At 60°, the reaction mixture became clear, then a precipitate started to form as the temperature of the reaction mixture reached 70°. The reaction was maintained under these conditions for one hour, then cooled to 10° and filtered. The product, 2,4-dimethylthiazole-5-(o-methoxycarboxanilide) hydrochloride, was washed with 15 ml. fresh cold acetonitrile and dried. 13.4 g. (90%) yield of the product, M.P. 206–9°, was obtained. Recrystallization of the product from ethanol/ether gave colorless needles, M.P. 208–9°.

---

[1] It is necessary to keep this reaction medium anhydrous because the product is very susceptible to hydrolysis which yields the free thiazole, M.P. 164–5°.

Having thus described my invention, what I claim and desire to protect by Letters Patent is:

1. The process of preparing a thiazole hydrohalide having the general formula:

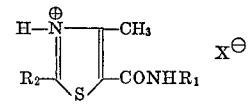

wherein X is halide, $R_1$ is phenyl or naphthyl or chloro-, bromo-, iodo-, $C_1$ to $C_6$ alkyl- or $C_1$ to $C_6$ alkoxy-substituted phenyl or naphthyl, and $R_2$ is $C_1$ to $C_{12}$ alkyl, either unsubstituted or substituted with chlorine, bromine or iodine or with phenyl or naphthyl, or is phenyl or naphthyl or chloro-, bromo-, iodo- or $C_1$ to $C_6$ alkyl-substituted phenyl or naphthyl or is a morpholido group or a $C_1$ to $C_6$ alkyl-substituted morpholido group, by reacting an α-haloacetoacetamide (I) having the general formula:

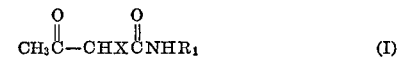

wherein X and $R_1$ are as above, with a thionamide having the general formula:

wherein $R_2$ is as above, wherein the improvement comprises
carrying out said reaction in the presence of acetonitrile or a nitrile (III) having the general formula:

wherein $R_2$ is as above, as a solvent for reactants I and II, in amount ranging from ¾ to 3 times the combined weights of said reactants I and II, causing precipitation of the thiazole hydrohalide from the reaction mixture, and separating the precipitated thiazole hydrohalide as the product from the reaction mixture.

2. A process as set forth in claim 1 including the further step of neutralizing the product thiazole hydrohalide separated from the reaction mixture with a base to form the free thiazole, and recovering said free thiazole from the neutralized mixture.

3. A process as set forth in claim 1 wherein reactant I is α-chloroacetoacetanilide, reactant II is thioacetamide, and the product is 2,4-dimethylthiazole-5-carboxanilide hydrochloride.

4. A process as set forth in claim 1 wherein reactant I is α-chloroacetoacetanilide, reactant II is thiobutyramide, and the product is 4-methyl-2-propylthiazole-5-carboxanilide hydrochloride.

5. A process as set forth in claim 1 wherein reactant I is α-chloroacetoacetanilide, reactant II is phenylacetothionamide, and the product is 2-benzyl-4-methylthiazole-5-carboxanilide hydrochloride.

6. A process as set forth in claim 1 wherein reactant I is α-chloroacetoacetanilide, reactant II is benzothionamide, and the reaction product is 4-methyl-2-phenylthiazole-5-carboxanilide hydrochloride.

7. A process as set forth in claim 1 wherein reactant I is α-chloroacetoacetanilide, reactant II is m-toluthionamide, and the reaction product is 4-methyl-2-m-tolylthiazole-5-carboxanilide hydrochloride.

8. A process as set forth in claim 1 wherein reactant I is α-chloroacetoacetanilide, reactant II is N-morpholinothionamide, and the reaction product is 4-methyl-2-N-morpholinothiazole-5-carboxanilide hydrochloride.

9. A process as set forth in claim 1 wherein reactant I is α-chloro-2,4,6-trimethylacetoacetanilide, reactant II is thionacetamide, and the reaction product is 2,4-dimethylthiazole-5-(2,4,6-trimethylcarboxanilide) hydrochloride.

10. A process as set forth in claim 1 wherein reactant I is α-chloroacetoacet-o-anisidide, reactant II is thionacetamide, and the reaction product is 2,4-dimethylthiazole-5-(o-methoxycarboxanilide) hydrochloride.

11. A process as set forth in claim 1 wherein a solution of said α-haloacetoacetamide and said thionamide in acetonitrile or said nitrile is heated at an elevated temperature to form said thiazole hydrohalide and initiate precipitation thereof, precipitation of said thiazole hydrohalide is completed by cooling the reaction mixture, and the precipitated thiazole hydrohalide product is separated from the cooled mixture.

References Cited
UNITED STATES PATENTS 3,458,526   7/1969   Lednicer _____ 260—302 R RICHARD J. GALLAGHER, Primary Examiner U.S. Cl. X.R.

71—90; 260—302 R, 999